(12) United States Patent
Sasaki

(10) Patent No.: US 7,929,225 B2
(45) Date of Patent: Apr. 19, 2011

(54) LENS ASSEMBLY AND IMAGING DEVICE

(75) Inventor: Ryota Sasaki, Saitama (JP)

(73) Assignee: Fujinon Corporation, Saitama (JP)

( * ) Notice: Subject to any disclaimer, the term of this patent is extended or adjusted under 35 U.S.C. 154(b) by 28 days.

(21) Appl. No.: 12/403,960

(22) Filed: Mar. 13, 2009

(65) Prior Publication Data
US 2009/0244736 A1   Oct. 1, 2009

(30) Foreign Application Priority Data

Mar. 28, 2008   (JP) .................. P2008-088521

(51) Int. Cl.
G02B 7/02   (2006.01)
(52) U.S. Cl. .................. 359/819; 359/821; 359/830
(58) Field of Classification Search .................. 358/811, 358/813, 819, 821, 830
See application file for complete search history.

(56) References Cited

U.S. PATENT DOCUMENTS

| 6,013,372 A | 1/2000 | Hayakawa et al. |
| 6,507,700 B1 | 1/2003 | Takekuma et al. |

FOREIGN PATENT DOCUMENTS

| JP | 10-85610 | * 10/1998 |
| JP | 2002-90603 A | 3/2002 |
| JP | 2004-86170 A | 3/2004 |
| JP | 2007-193319 A | 8/2007 |

* cited by examiner

*Primary Examiner* — Ricky L Mack
*Assistant Examiner* — Brandi N Thomas
(74) *Attorney, Agent, or Firm* — Birch, Stewart, Kolasch & Birch, LLP

(57) ABSTRACT

A lens assembly is provided and includes: a plurality of lenses; a lens frame having a hollow part which includes an opening on each of an object side and an image forming side of the lens assembly and into which the plurality of lenses are inserted with their optical axes aligned; and a first coating film provided on an image forming side surface of a first lens that is located nearest to the object side among the plurality of lenses inserted into the hollow part, the first coating film being more hydrophilic than that of a base body of the first lens.

12 Claims, 3 Drawing Sheets

LENS ASSEMBLY AND IMAGING DEVICE

This application is based on and claims priority under 35 U.S.C §119 from Japanese Patent Application No. 2008-088521, filed on Mar. 28, 2008, the entire disclosure of which is herein incorporated by reference.

BACKGROUND OF THE INVENTION

1. Field of the Invention

The present invention relates to a lens assembly having a waterproof function and an imaging device having the lens assembly.

2. Description of Related Art

Recently, motor vehicles have been equipped with cameras. Most of the cameras employ circumstances that navigation systems are popularized and display screen are provided in driver's seats to display the states of places of the dead angle for the drivers on the display screens.

In such a camera to be mounted on a vehicle, since a lens located at a part nearest to the object side is arranged to be exposed to the surface of a vehicle body, a strict waterproof performance is required. Accordingly, in most of lens assemblies to be mounted on the vehicle, an O ring is inserted into a part between the outer peripheral surface of the lens located at the part nearest to the object side and the inner peripheral surface of a lens frame to prevent the entry of water (for instance, see JP-A-2002-090603).

FIG. 1 is a diagram showing one example of the structure of a lens assembly to be mounted on a vehicle.

FIG. 1 is a perspective view of a lens assembly 1 seen from an obliquely upward part that includes lenses 11 to 14 and a lens frame 10 having an object side opening and an image forming side opening and a hollow part into which the four lenses 11 to 14 are inserted with their optical axes aligned.

FIG. 1 shows, in order to easily obtain a dustproof performance or a waterproof performance, an example of a structure in which the lenses 11 to 14 are respectively inserted into the lens frame 10 with the outer peripheral edges of the lenses 11 to 14 coming into contact and their optical axes aligned, and the lenses 11 to 14 are formed so that as the lenses come nearer to the object side, the diameters of the lenses become larger. Further, an example is shown that after the lenses 11 to 14 are accommodated in the lens frame 10, a front end of the lens frame is bent by a thermally caulking operation to hold the lens 14.

In such a structure as shown in FIG. 1, when an O ring 15 is mounted between an outer peripheral surface of the first lens 14 located at a part nearest to the object side and an inner peripheral surface of the lens frame, an excellent waterproof performance and a dustproof performance can be obtained. As a material of the O ring, ethylene propylene rubber, silicon rubber, or the like may be employed.

However, the motor vehicle can move to various places including an environment of high temperature and high humidity or an environment of low temperature and low humidity. Accordingly, even when the above-described O ring 15 is used to prevent the entry of water from an external part, if such a cavity part 16 as shown in FIG. 1 is formed on a rear surface side of the first lens 14 located at the part nearest to the object side, a phenomenon may arise that when the motor vehicle moves to the environment of the high temperature and high humidity from the environment of the low temperature and low humidity, a vapor condensation occurs in the cavity part 16 due to the existence of air including vapor in the cavity part 16 to stick water droplets to the image-forming side surface of the first lens 14 and the object side surface of the second lens 13.

JP-A-2007-193319 discloses a technique that a vent port is provided which exhibits a higher ventilation capability when a lens assembly is moved from an environment of low temperature and low humidity to an environment of high temperature and high humidity than that when the lens assembly is moved from the environment of the high temperature and high humidity to the environment of the low temperature and low humidity, so as to prevent the water droplets from sticking to the surface of the first lens 14 and the surface of the second lens 13 shown in FIG. 1. However, when the vent port communicating with an external part is provided, another problem arises that dust enters the cavity part 16 to stick dust to the surface of the first lens 14 and the surface of the second lens 13.

To most of window glasses of motor vehicles or lenses of glasses that are dimmed to cause a danger, a dimness preventing coating is applied. JP-A-2004-086170 presents some of mixed materials preferably used when coating films are formed on the window glasses of the motor vehicles or the lenses of the glasses. To prevent a vapor condensation by using the technique of JP-A-2004-086170, a coating may be supposed to be applied to the lenses respectively of the above-described lens assembly. However, when the coating is applied to the lenses respectively, a production cost required for one lens increases so that the production cost of the lens assembly is increased.

SUMMARY OF THE INVENTION

An object of an illustrative, non-limiting embodiment of the present invention if to provide an inexpensive lens assembly having a structure in which even when the lens assembly moves from an environment of low temperature and low humidity to an environment of high temperature and high humidity, water droplets hardly stick to the surfaces of lenses in the lens assembly and an imaging device including the lens assembly.

According to an aspect of the invention, there is provided a lens assembly including:

a plurality of lenses;

a lens frame having a hollow part which includes an opening on each of an object side and an image forming side of the lens assembly and into which the plurality of lenses are inserted with their optical axes aligned; and a first coating film provided on an image forming side surface of a first lens that is located nearest to the object side among the plurality of lenses inserted into the hollow part, the first coating film being more hydrophilic than that of a base body of the first lens.

As described above, when such a cavity part 16 as shown in FIG. 1 is formed on the rear surface side of the first lens 14 located at the part nearest to the object side, a phenomenon may arise that when the motor vehicle moves to the environment of the high temperature and high humidity from the environment of the low temperature and low humidity, a vapor condensation occurs in the cavity part 16 due to the existence of air including vapor in the cavity part 16 to stick water droplets to the image forming side surface of the first lens 14 and the object side surface of the second lens 13.

Thus, in the lens assembly according to an aspect of the present invention, the first coating film more hydrophilic than that of the base body of the first lens is formed on the image-forming side surface of the first lens which is located nearest to the object side of the plurality of the lenses inserted into the hollow part. Accordingly, when water droplets are apt to stick to the surface of the first lens in the image forming side due to the vapor condensation, the coating film prevents the water droplets from sticking to the surface of the first lens. The water droplets change to water by the prevention and the water flows. In such a way, even when such a little water as to become the water droplets flows out, its influence hardly gives to an optical performance. Further, under an environment of high temperature in which the vapor condensation occurs, the water evaporates.

The lens assembly may further include a second coating film provided on an object side surface of a second lent that is located adjacent to and on the image forming side of the first lens, the second locating film being more hydrophilic than that of a base body of the second lens.

Since the object side surface of the second lens that is located on the object side subsequently to the first lens strongly receives an influence of an ambient environment, the second coating film is preferably provided. Even when the coating is applied to the object side surface of the second lens, a cost hardly increases.

Each of the first coating film and the second coating film may be made of a mixed material including silica ($SiO_2$) and at least one material selected from $TiO_2$, $ZnO_2$, $SnO_2$, $SrTiO_3$, $WO_3$, $Bi_2O_2$ and $Fe_2O_3$.

When the mixed materials described in JP-A-2007-193319 are used as the coating films, a hydrophilic property of a water contact angle of 20° or smaller is obtained so that the water droplets are liable to become a little water and flow. Accordingly, a phenomenon is prevented that the water droplets stick to the surface of the lens to give an adverse influence to the optical performance. Further, under the environment of the high temperature, a little water that flows out naturally evaporates.

Further, each of the first coating film and the second coating film may have a water contact angle of 40° or smaller.

Ordinarily, a coating film having the water contact angle of 40° or smaller is referred to as a hydrophilic coating film. Even when the coating film does not have the water contact angle of 20° or smaller as described above, the hydrophilic coating film having the water contact angle of 40° or smaller can be used to sufficiently obtain an effect.

Here, surfaces of lenses located in the image forming surface side equal to or after the image forming surface side of the second lens may not have hydrophilic coating films.

A peripheral edge part of the image forming side surface of the first lens and a peripheral edge part of the object side surface of the second lens may come into contact with each other around the peripheral edge part and have a cavity part between the first lens and the second lens in a central part surrounded by the peripheral edge part, and the first coating film may be formed on a part of the image forming side surface of the first lens which forms the cavity part.

The second coating film may be formed on a part of the object side surface of the second lens which forms the cavity part.

Thus, the image forming side surface of the first lens 14 and the object side surface of the second lens 13 which form the cavity part 16 shown in FIG. 1 are respectively covered with the first coating film and the second coating film. Therefore, the water droplets do not stick to both the image forming side surface of the first lens 14 and the object side surface of the second lens 13 which form the cavity part 16 shown in FIG. 1 so that the water droplets change to a little water and flow out. Since a little water evaporates under the environment of the high temperature in which the vapor condensation occurs, an adverse influence is prevented from being given to the optical performance.

An O ring may be provided between the first lens and an inner wall of the hollow part.

As described above, a small quantity of water may be produced, however, there is a fear that when the lens assembly is mounted on a motor vehicle, a large quantity of water enters the cavity part through a car washing machine. In such a way, when a quantity of water increases, an adverse effect is assuredly applied to the optical performance. Thus, the O ring may be provided so that water does not enter the cavity part from an external part through a small space between the outer periphery of the first lens and the inner wall of the lens frame.

An imaging device according to an aspect of the invention includes: the above-described lens assembly and an imaging element.

According to an aspect of the present invention, the imaging device strong in vapor condensation can be obtained.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

According to an exemplary embodiment of the present invention, it is possible to provide a lens assembly having a structure in which droplets hardly stick to the surface of the lenses in the lens assembly, and to provide an imaging device including the lens assembly.

Now, an exemplary embodiment of the present invention will be described below.

Figure 2:
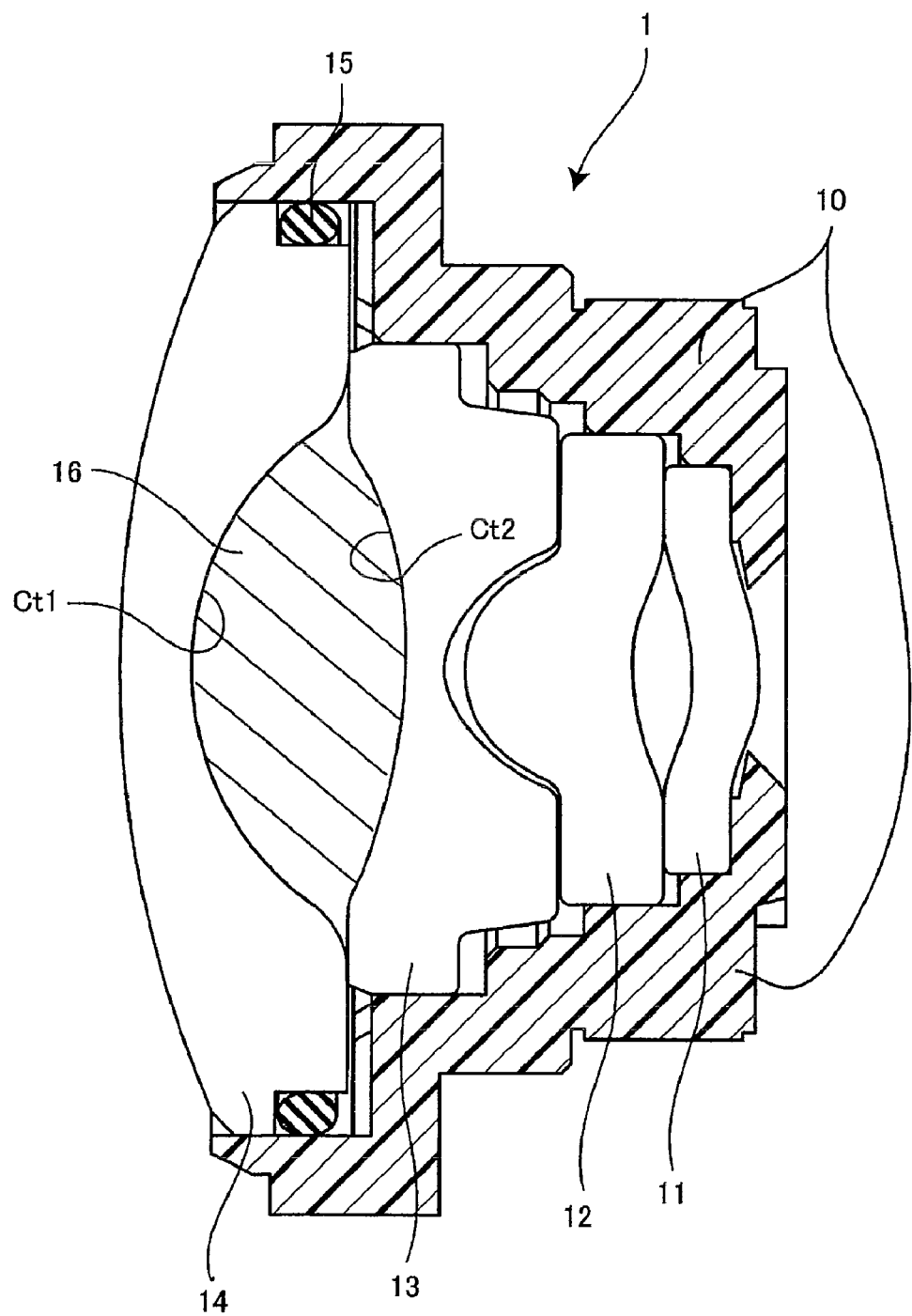
FIG. 2 is a sectional view showing a structure of a lens assembly according to an exemplary embodiment of the present invention.

FIG. 2 is a sectional view showing the structure of a lens assembly of an exemplary embodiment of the present invention.

Figure 1:
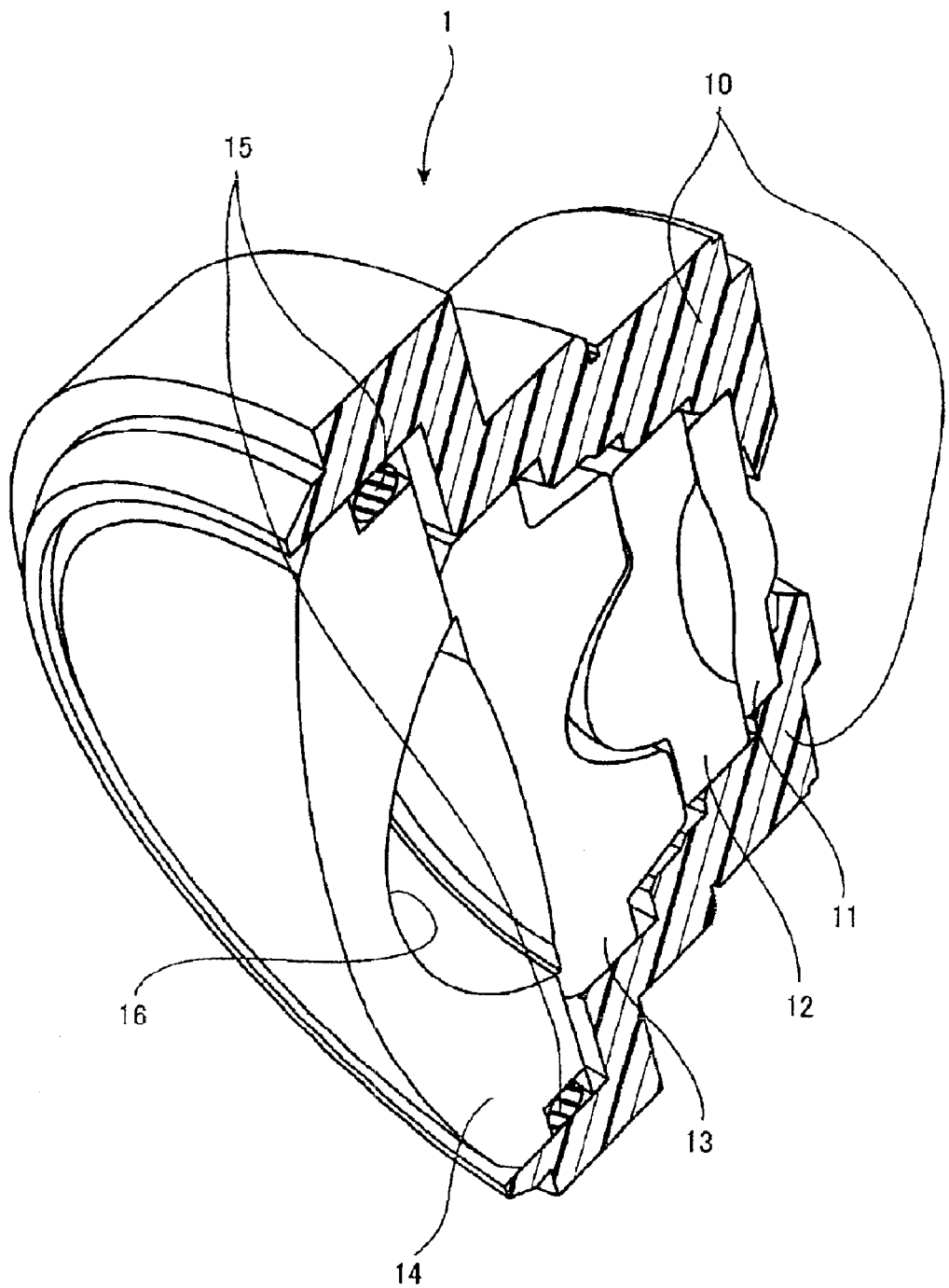
FIG. 1 is a diagram showing one example of a structure of a lens assembly to be mounted on a vehicle.

FIG. 2 shows the lens assembly having the same structure as that of FIG. 1.

Here, a first lens 14 and a second lens 13 in the lens assembly 1 of this embodiment include a peripheral edge part of the image forming side surface of the first lens 14 and a peripheral edge part of the object side surface of the second lens 13 which come into contact with each other around each of the peripheral edge parts. A cavity part 16 is formed between the first lens and the second lens in a central part surrounded by the peripheral edge parts. A first coating film Ct1 is formed on a part of the image forming side surface of the first lens 14 which forms the cavity part 16. A second coating film Ct2 is formed on a part of the object side surface of the second lens 13 which forms the cavity part 16.

Both the first coating film Ct1 and the second coating film Ct2 are coating films made of a mixed material including silica ($SiO_2$) and at least one material selected from $TiO_2$, $ZnO_2$, $SnO_2$, $SrTiO_3$, $WO_3$, $Bi_2O_2$ and $Fe_2O_3$, and have a property of water contact angle of 40° or smaller.

Therefore, both the hydrophilic coating films on the image forming side surface of the first lens 14 and the object side surface of the second lens 13 which form the cavity part 16 in which a vapor condensation is most liable to occur prevent water droplets from sticking to these surfaces even under an environment of high temperature and high humidity. Therefore, an adverse effect is prevented from being applied to an optical performance, so that a good optical performance can be constantly obtained. Further, in this embodiment, since the coating films are formed only on the surfaces of the lenses forming the cavity part in which the vapor condensation is most liable to occur, the increase of a production cost can be successfully suppressed to a minimum value. According to this structure, the production cost required for one lens assembly hardly changes.

Since the water droplets are more prevented from sticking to the surfaces of the lenses, such a little water as to have the water droplets the more flows on the surfaces. However, since a quantity of water is extremely small, the adverse effect is not applied to the optical performance. Further, under en environment of high temperature, water evaporates.

Further, in this embodiment, since an O ring 15 is originally provided between the first lens 14 and an inner wall 100 of a hollow part, when the lens assembly 1 is arranged in a motor vehicle, even if the lens assembly receives the pressure of water from a car washing machine, the water is prevented from entering the cavity part by the O ring. Accordingly, the water droplets do not stick to the image forming side surface of the first lens and the object side surface of the second lens which form the cavity part, so as to obtain constantly the good optical performance.

As described above, the inexpensive lens assembly having a structure can be realized in which the water droplets hardly stick to the surfaces of the lenses in the lens assembly.

Finally, an example will be described that the lens assembly 1 is applied to a camera to be mounted on a vehicle.

Figure 3:
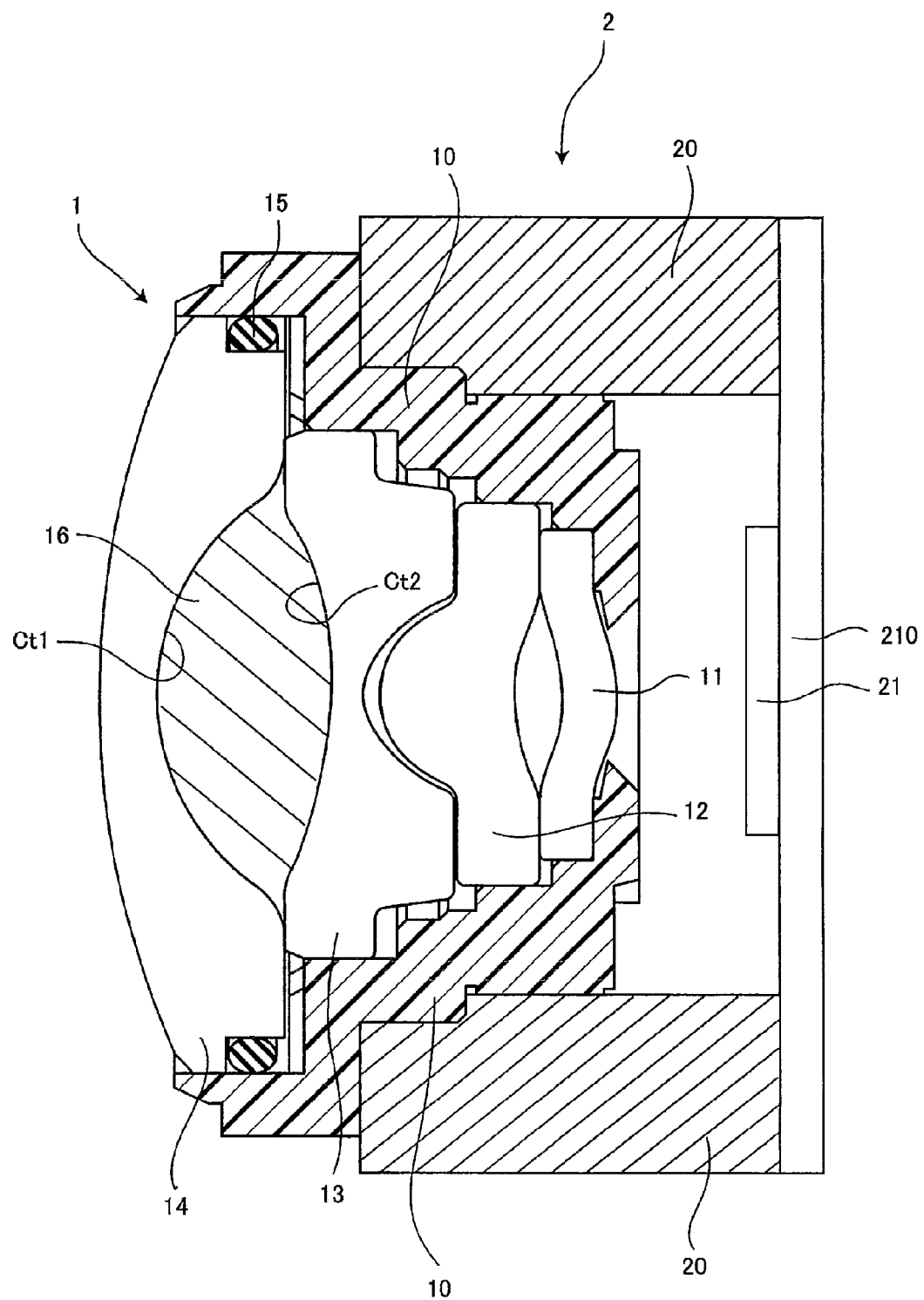
FIG. 3 is a diagram showing a camera in which the lens assembly shown in FIG. 1 is incorporated.

FIG. 3 is a diagram showing a camera in which the lens assembly is incorporated.

FIG. 3 is a diagram showing a surface of a camera unit 2 taken along an optical axis seen from an obliquely upward part.

The camera unit 2 shown in FIG. 3 includes the lens assembly 1 shown in FIG. 1, a camera main body frame 20 and an imaging element 21. The imaging element 21 is mounted on a base board 210 of the imaging element and stuck and fixed to the camera main body frame 20.

When the camera unit 2 is assembled, the lens assembly 1 shown in FIG. 1 is initially inserted into the camera main body frame 20 to stick and fix the lens assembly 1 to the camera main body frame 20. At this time, an adhesive agent is applied to a part where the outer peripheral edge of the lens frame 10 comes into contact with the front edge of the camera main body frame 20 to carry out a waterproof process so that water does not enter an inner part of the camera unit from the front edge side. Further, the base board 210 on which the imaging element 21 such as a CCD solid state imaging element is mounted is stuck and fixed to the camera main body frame 20.

In such a way, when the lens assembly 1 is incorporated in the camera unit 2, the camera unit very strong to a vapor condensation is manufactured and preferably applied to a motor vehicle.

What is claimed is:

1. A lens assembly comprising:
a plurality of lenses;
a lens frame having a hollow part which includes an opening on each of an object side and an image forming side of the lens assembly and into which the plurality of lenses are inserted with their optical axes aligned;
a first coating film provided on an image forming side surface of a first lens that is located nearest to the object side among the plurality of lenses inserted into the hollow part, the first coating film being more hydrophilic than that of a base body of the first lens;
a second coating film provided on an object side surface of a second lens that is located adjacent to and on the image forming side of the first lens, the second coating film being more hydrophilic than that of a base body of the second lens;
wherein surfaces of lenses located in the image forming surface side equal to or after an image forming surface side of the second lens do not have hydrophilic coating films.

2. The lens assembly according to claim 1, wherein each of the first coating film and the second coating film includes a mixed material of silica and at least one material selected from the group consisting of $TiO_2$, $ZnO_2$, $SnO_2$, $SrTiO_3$, $WO_3$, $Bi_2O_2$, and $Fe_2O_3$.

3. An imaging device comprising: a lens assembly according to claim 2, and an imaging element.

4. The lens assembly according to claim 1, wherein each of the first coating film and the second coating film has a water contact angle of 40° or smaller.

5. An imaging device comprising: a lens assembly according to claim 4, and an imaging element.

6. The lens assembly according to claim 1, wherein
a peripheral edge part of the image forming side surface of the first lens and a peripheral edge part of the object side surface of the second lens come into contact with each other around the peripheral edge part and have a cavity part between the first lens and the second lens in a central part surrounded by the peripheral edge part, and
the first coating film is formed on a part of the image forming side surface of the first lens which forms the cavity part.

7. The lens assembly according to claim 6, wherein the second coating film is formed on a part of the object side surface of the second lens which forms the cavity part.

8. An imaging device comprising: a lens assembly according to claim 7, and an imaging element.

9. The lens assembly according to claim 6, further comprising an O ring provided between the first lens and an inner wall of the hollow part.

10. An imaging device comprising: a lens assembly according to claim 9, and an imaging element.

11. An imaging device comprising: a lens assembly according to claim 6, and an imaging element.

12. An imaging device comprising: a lens assembly according to claim 1, and an imaging element.

* * * * *